May 1, 1928.
W. C. BRINTON
FREIGHT WEIGHING DEVICE
Filed Dec. 16, 1921
1,667,717
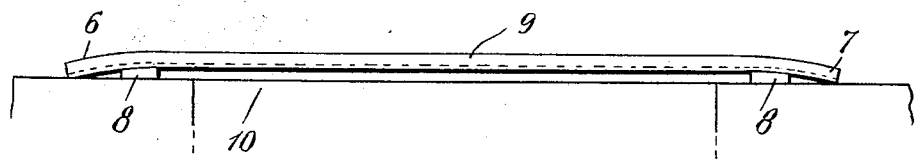
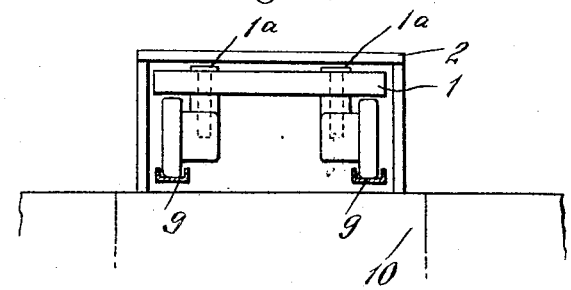
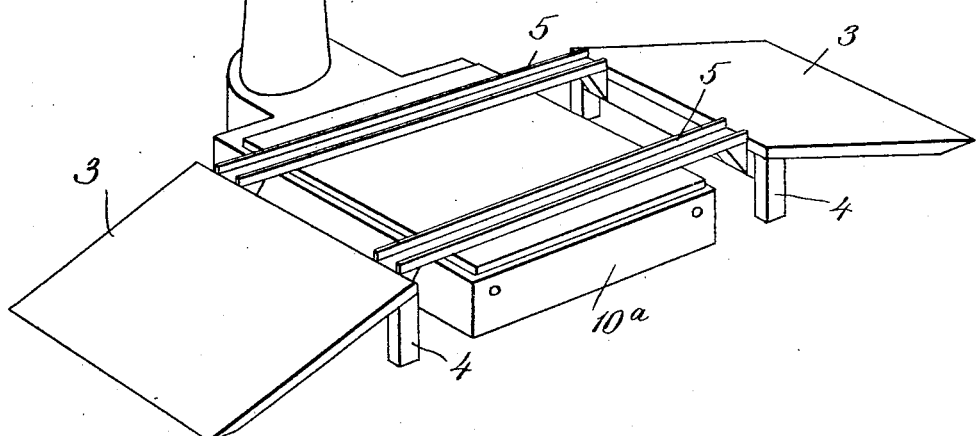
Inventor
Willard C. Brinton
By his Attorney
E. W. Marshall Patented May 1, 1928.

1,667,717

UNITED STATES PATENT OFFICE.

WILLARD C. BRINTON, OF NEW YORK, N. Y., ASSIGNOR TO TERMINAL ENGINEERING COMPANY, INC., OF NEW YORK, N. Y., A CORPORATION OF NEW YORK.

FREIGHT-WEIGHING DEVICE.

Application filed December 16, 1921. Serial No. 522,334.

My invention relates to freight weighing devices adapted for use with industrial trucks of the lift type which carry separate platforms from place to place. It is usual to have a number of load platforms handled by a single truck. The platform is placed wherever desired, is loaded when convenient and the truck comes back, slides under the platform and lifts it by jacks or other means. While in the raised position the platform is transported to any desired unloading place, is lowered and left there for unloading while the truck may go about other work.

It is an object of this invention to provide means whereby such a loaded platform may be weighed in transit between loading and unloading points.

It is a further object to provide means whereby the scales may be used for weighing the platform and its load which are not of sufficient size or capacity to weigh the truck also.

It is another object of this invention to provide bridging or truck supporting means to make possible the use of any scales available having the capacity of any loaded platform, and which means is designed for the purpose of holding the truck clear of the scales while the platform is placed thereon, weighed, and again lifted to the back of the truck.

With the foregoing and other objects in view which will become apparent as the description proceeds, my invention resides in the combination and arrangement of parts and in the details of construction described in the specification and particularly pointed out in the appended claims, one preferred embodiment of my invention being shown in the drawings, it being understood, however, that changes may be made within the scope of what is claimed without departing from the spirit of the invention. I intend no limitations other than those of the claims.

In the drawings:

Fig. 1 designates in elevation a bridging member positioned for use.

Fig. 2 designates in end elevation a bridging member with a truck thereon and a platform lowered to weighing position on the scales.

Fig. 3 designates a modified form of bridging member as used with portable scales.

Similar reference characters relate to similar parts throughout the views.

10 designates a scale platform which it is common to build in at ground level. Above and bridging the scales are two parallel members 9, 9, preferably steel channels. These channels have a center spacing distance equal to the center to center distance or gauge of truck wheels, and are raised slightly above the platform of the scales.

At each end of the channels 9, 9, are supporting cross beams 8, 8, to which the channels are attached and properly spaced, the cross beams resting on the ground or floor into which the scale platform is sunk.

The ends 6, 7, of the channels 9 are preferably bent downwards to form an inclined or sloping approach from either side for the truck.

In the modification of Fig. 3, portable scales 10ª are shown. The bridging device comprises a pair of members 5, 5, preferably channels, supported as by uprights 4, 4, on either side of the scales. Leading to the channels on each side are sloping runways 3, 3, which may be of any desired construction and of a width corresponding to or greater than the over-all width of the bridging portion of the device.

When the truck 1 (Fig. 2) is run into mid position over the scales, the jacks, 1ª, or other lifting devices are lowered and the load platform, 2, carried is thus permitted to rest on the weighing platform of the scales. The load platform 2 has four supporting legs so spaced as to permit the truck to run beneath the platform.

It is apparent that the bridging device (Fig. 2) must be of a less breadth than the scale platform and fall within the legs of the truck load platform so that, as the load platform is lowered, the legs thereof will rest on the scales. The truck may remain under the platform and on the bridging support during the weighing or may be backed off, as desired.

Numerous changes in form, size and arrangement of parts may be made according to such operating conditions as may be encountered in the practice of the invention. For example, any desired arrangement of bridging device 5 may be employed, to accommodate platform carrying trucks of varying character and having variously characterized wheel gauges. Or a single truck may have one wheel gauge for its front wheels and a different gauge for its rear wheels; or it may be a three wheel truck. The bridge devices may be readily modified for such forms of truck without departing from the spirit of the invention.

What I claim is:—

1. In a weighing device, a scale having a platform and bridging means disposed above and extending across the platform and vertically spaced therefrom, said bridging means being of less breadth and greater length than the platform and adapted and arranged to support a load carrier out of contact with the platform.

2. In a weighing device for lift truck loads, in combination, a lift truck, a load platform therefor, weighing means having a platform for said load platform and supporting means for the lift truck of less breadth and greater length than said weighing means platform and out of operative engagement therewith, whereby said load platform may be placed on said weighing platform independent of said lift truck.

3. A bridging device for scales comprising a pair of parallel channels adapted and arranged as truck wheel runways, means to support said channels over the scale platform and out of operative engagement therewith. the ends of said channels being depressed to form an approach to said runways.

4. In a weighing device, a scale having a platform, and a bridging device comprising a plurality of substantially parallel members extending across and spaced vertically above the scale platform and formed to support a load carrier out of engagement with the platform while the load is being weighed, said bridging members being spaced inwardly from opposite edges of the scale platform.

5. In combination with a weighing device, a plurality of substantially parallel runways extending over a scale platform and spaced apart by distances corresponding to predetermined truck wheel gauges, said scale platform being arranged to support the wheel truck load independently of the wheel truck while being weighed.

6. In combination, a carrier platform having supporting legs, a scale platform and bridging means extending over and spaced from said scale platform, said bridging means being spaced apart a less distance than the transverse distance between the platform legs.

7. In a weighing device, means including a platform support engageable by the load to be weighed for weighing a load, and means disposed above and extending across the platform support for supporting the load carrier independently of the platform support while the load is being weighed.

8. In a weighing device, a scale platform, means for guiding a tare and a load into position over the platform, said guiding means extending across the platform and spaced therefrom being constructed and arranged to support the tare while the load is being weighed.

Signed at New York city in the county of New York and State of New York this 13th day of December 1921.

WILLARD C. BRINTON.